US007992641B2

(12) United States Patent
Hitzman et al.

(10) Patent No.: US 7,992,641 B2

(45) Date of Patent: Aug. 9, 2011

(54) METHOD AND APPARATUS FOR ON-SITE NITRATE PRODUCTION FOR A WATER PROCESSING SYSTEM

(75) Inventors: Donald O. Hitzman, Bartlesville, OK (US); D. Michael Dennis, Bartlesville, OK (US)

(73) Assignee: Nitra-Gen LLC, Ochelata, OK (US)

( * ) Notice: Subject to any disclaimer, the term of this patent is extended or adjusted under 35 U.S.C. 154(b) by 0 days.

(21) Appl. No.: 12/886,332

(22) Filed: Sep. 20, 2010

(65) Prior Publication Data

US 2011/0008217 A1 Jan. 13, 2011

Related U.S. Application Data

(62) Division of application No. 12/418,006, filed on Apr. 3, 2009, now Pat. No. 7,828,061.

(51) Int. Cl.
*E21B 43/22* (2006.01)

(52) U.S. Cl. .................... 166/310; 166/75.12; 166/90.1; 166/263; 166/279; 166/305.1

(58) Field of Classification Search ........................ None
See application file for complete search history.

(56) References Cited

U.S. PATENT DOCUMENTS 4,141,715 A 2/1979 Wyse et al.
4,267,027 A 5/1981 Amouroux et al.
4,818,494 A * 4/1989 Eastin ........................... 422/191
5,044,435 A 9/1991 Sperl et al.
5,405,531 A 4/1995 Hitzman et al.
7,674,443 B1 3/2010 Davis

FOREIGN PATENT DOCUMENTS

WO WO 2004048851 A1 6/2004

OTHER PUBLICATIONS

Notice of Allowance U.S. Appl. No. 12/886,308 dated Dec. 27, 2010.

* cited by examiner

*Primary Examiner* — Zakiya W. Bates

(74) *Attorney, Agent, or Firm* — Stephen A. Bent; Foley & Lardner LLP

(57) ABSTRACT

An electric plasma arc apparatus and method produces nitrogen compounds, solely using ambient air extracted in proximity to the apparatus. The nitrogen compounds are brought into contact with a water processing system, forming nitrate on-site. Hydrogen sulfide present in the water processing system is removed, and the production of hydrogen sulfide by sulfate-reducing bacteria (SRB) is eliminated by introducing nitrate into the system, whereby denitrifying microorganisms, using the nitrate, outcompete the sulfate-reducing bacteria for the available carbon nutrients, thus preventing the SRB from producing hydrogen sulfide. Nitrate ions generated in the water processing system which contains the denitrifying microorganisms can enhance oil recovery by means of microbial enhanced oil recovery mechanisms. Further, the electric plasma arc apparatus and methodology eliminate major costs of conventional treatment techniques, including the transportation and storage of nitrate and the need for a continuous supply of natural gas and water.

19 Claims, 4 Drawing Sheets

1
50
60
reservoir
40
10
30
20
Reactor
Nitrogen comps.
80
70
nitrogen
oxygen
Air
Water

METHOD AND APPARATUS FOR ON-SITE NITRATE PRODUCTION FOR A WATER PROCESSING SYSTEM

CROSS-REFERENCE TO RELATED APPLICATIONS

This application is a Divisional Application of U.S. application Ser. No. 12/418,006 filed Apr. 3, 2009. The subject matter of which is incorporated in entirety by reference.

BACKGROUND OF THE INVENTION

1. Field of the Invention

The invention relates to methodology and apparatus for on-site production of nitric oxide (NO) and nitrogen dioxide ($NO_2$), which yield water soluble nitrate ion ($NO_3^-$), and for bringing nitrate ions into contact with a water processing system, particularly in the context of an oil-field application.

2. Background of the Invention

Primary oil recovery generally yields less than 50% of what a given geological structure or reservoir contains. Accordingly, water injection is employed to enhance oil recovery from the porous rock formations that comprise many subterranean oil reservoirs. In enhanced oil recovery, a water processing system is used to inject a water solution into an oil reservoir. A water processing system can include above-ground facilities equipped with an apparatus or some facility that collects or distributes aqueous solutions, such as oil and gas wells, oil-water separators, water storage tanks, water treatment tanks, pipelines, and injection wells, water treatment facilities, or water transportation equipment. The injection process is known to produce hydrogen sulfide ($H_2S$), however, which sours oil and gas reservoirs as well as the water processing systems and equipment associated with oil and gas recovery operations.

Hydrogen sulfide is produced by sulfate-reducing bacteria (SRB), which convert soluble sulfate ($SO_4$) in the water processing system and oil and gas reservoirs to hydrogen sulfide. Such bacteria can arise during the drilling for oil, but they also may be present indigenously, before the drilling, and are known to be present in the aqueous phase of virtually all oil field operations. These bacteria and their affect on oil fields are described, for example, by J. R. Postgate, The Sulphate-Reducing Bacteria 2$^{nd}$ ed. (Cambridge University Press, 1984).

The contamination of oil and gas reservoirs and water processing systems by sulfate-reducing-bacteria (SRB) with hydrogen sulfide ($H_2S$) has become a major operational problem and expense for the petroleum industry. The presence of undesirable amounts of hydrogen sulfide causes serious health and safety risks, severe corrosion of the equipment used to recover oil, and can drastically damage the production capabilities of the oil field by the formation of iron sulfide particles which precipitate and cause the clogging of recovery equipment and oil and gas reservoirs, thereby reducing oil volume and lowering the commercial value of the recovered crude oil. Accordingly, there has been intensive investigation directed at preventing the formation of hydrogen sulfide and/or removing the hydrogen sulfide once it is produced in oil field applications.

Treating the affected oil and gas reservoirs and water processing systems with nitrate is effective in degrading existing $H_2S$ and preventing further occurrence of $H_2S$. For example, it is known that the addition of nitrate and nitrate compounds to a system containing SRB will reduce the amount of SRB in the system and thus the amount of hydrogen sulfide formed by SRB. This method relies on strains of *Thiobacillus denitrificans* and other denitrifying microorganisms that are present in oil field waters. For example, hydrogen sulfide present in a water processing system is removed and the production of hydrogen sulfide by sulfate-reducing bacteria is prevented by introducing nitrate into the system, whereby denitrifying microorganisms utilize the nitrate and produce several mechanisms and conditions that prevent the SRB from producing hydrogen sulfide.

Nitrate for this purpose is typically manufactured by oxidizing ammonia or mined by conventional practice, and the resultant dry nitrate is transported, blended into liquid solutions, and stored in close proximity to an oil field or other remote site for use. The logistical chain of manufacturing and movement of dry nitrate compounds through the supply chain has many safety and health issues and has proved to be needlessly expensive while leading to shortages and intermittent supply of nitrate to the point-of-use, or no supply at all. Currently, nitrate is (1) sourced in dry form from manufacturing plants, (2) transported by various means including rail, trucking, and oceanic shipping and (3) stored in warehousing until needed.

Transporting and storing large quantities of dry nitrate, or blends of nitrate in solution raises numerous safety and cost issues. Once needed, nitrate is transported to blending plants to blend with water as a useable product and transported again to supply oil and gas production operations that are most often located off-shore and in remote on-shore locations far removed from the origin of nitrate manufacturing. Further, large quantities of nitrate must be stored on-site.

The conventional mode of nitrate manufacturing uses the Haber process and is dependent on a constant source of natural gas as the critical component of manufacture. Manufacturing plants are dependent on the price for natural gas which has a direct relationship to the cost of nitrates. New Haber-type manufacturing plants require several hundreds of millions of dollars and several years to construct and must be strategically located near reliable sources of natural gas. Transportation, storage, and blending costs have also increased significantly. Consequently, nitrate prices are at historical highs and are expected to keep increasing with time as the demand continues to grow.

Accordingly, the need exists for an economical and effective means to produce nitrate locally and to bring it into contact with a water processing system, in order to prevent the formation of hydrogen sulfide and/or to remove any existing hydrogen sulfide in the water processing system or an oil and gas reservoir supplied by the water processing system. Further, there is a need for means to produce nitrate locally and to bring nitrate into contact with a water processing system that is useful in the recovery of oil; this, so that $H_2S$ contamination will not adversely affect the reservoir or equipment used in the oil recovery process.

SUMMARY OF THE INVENTION

In relation to these and other needs, the present invention provides a system by which nitrogen compounds are produced on-site and brought into contact with a water processing system. The inventive system comprises an (A) integrated system that is comprised of (i) a compression device that takes in ambient air and (ii) an electric plasma arc reactor, connected to the compression device, that processes and reacts oxygen and nitrogen present in the ambient air to form the nitrogen compounds, (B) a delivery device, interconnecting the integrated system to the water processing system, for bringing the nitrogen compounds into contact with the water processing system to form nitrate, and (C) an oil and gas reservoir that receives water from the water processing system in combination with the nitrogen compounds.

Another aspect of the present invention relates to a method of producing nitrogen compounds at a facility and bringing the nitrogen compounds into contact with a water processing system in proximity to the facility, comprising taking in oxygen and nitrogen from ambient air, processing and reacting oxygen and nitrogen present in the ambient air with an electric plasma arc reactor to form the nitrogen compounds, bringing the nitrogen compounds into contact with the water processing system to form nitrate and sending water in combination with the nitrogen compounds to an oil and gas reservoir.

DETAILED DESCRIPTION OF THE PREFERRED EMBODIMENTS

Figure 1:
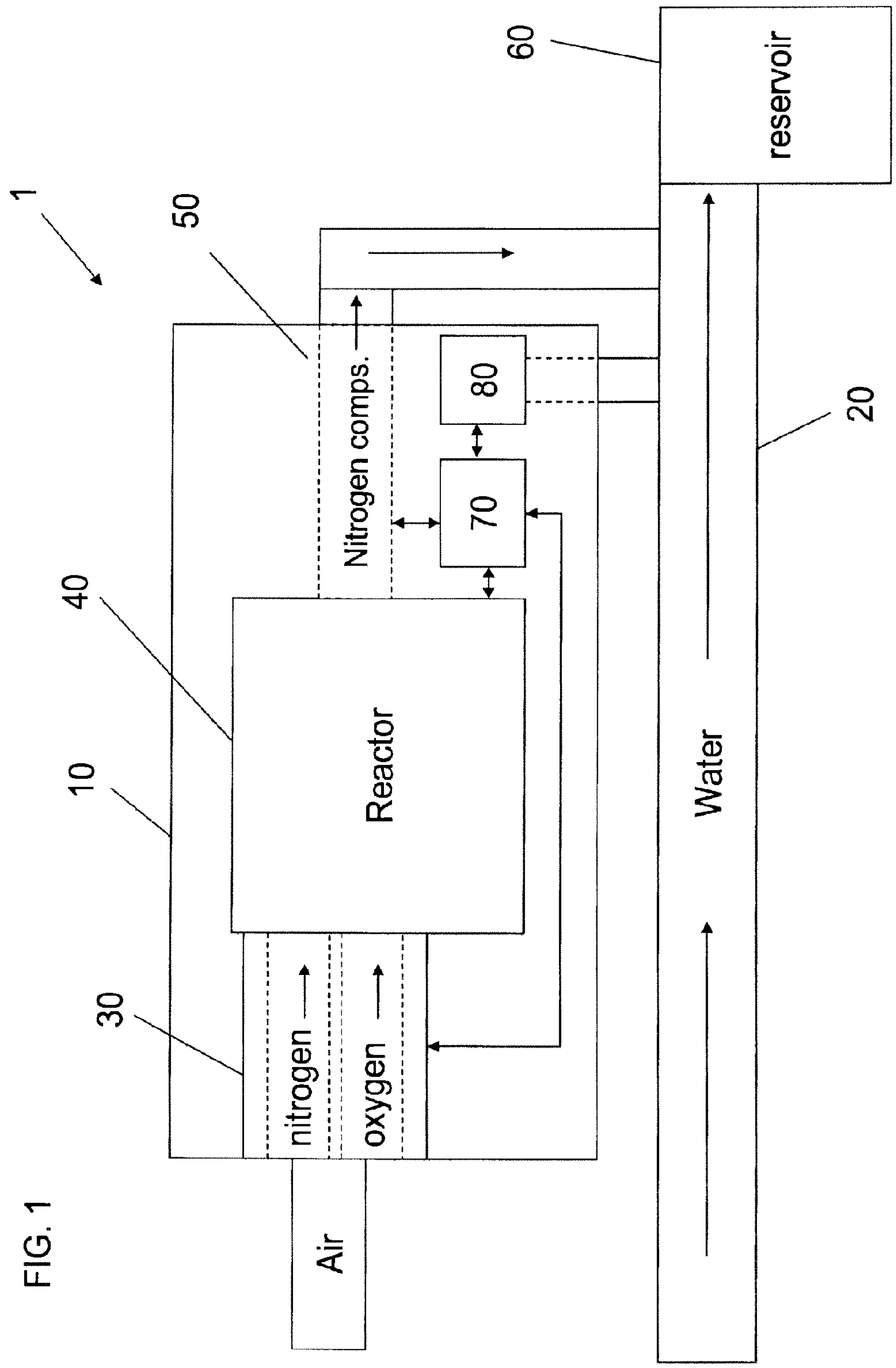
FIG. 1 is a block diagram of a system where nitrate is produced on-site and brought into contact with a water processing system, according to one embodiment of the present invention.

The present invention can be used anywhere a need exists to control the hydrogen sulfide generation by SRB or to remove preformed hydrogen sulfide in a water processing system. Hydrogen sulfide corrodes oil recovery processing equipment and can cause severe damage to the oil-recovery capabilities of the equipment by forming iron sulfide precipitates that clog production equipment and clog oil and gas reservoirs, thereby reducing oil volume, which lowers the market value of the oil produced. Thus, in water treatment applications the presence of $H_2S$ in pipelines, tanks, and other water-handling equipment and facilities must be regulated. The addition of nitrate and nitrate solutions in water treatment applications affects both removal of preformed $H_2S$ and in addition prevents further generation of $H_2S$ by SRB, which may be present in the system or may be added later, such as during the drilling operation of oil fields.

Nitrate for this purpose typically is mined or manufactured by oxidizing ammonia, which, by conventional practice, is transported in dry form, mixed into a liquid solution and stored in close proximity to an oil field or other remote site for processing and use. The attendant technical, safety, and cost issues associated with transporting, blending, and storing nitrate and nitrate solutions are avoided by providing for the on-site production of nitrate. In order to produce nitrate on-site, that is, in proximity to a facility, a system for carrying out a number of chemical reactions likewise is placed in proximity to the facility. The system requires at least water, natural gas and ambient air, all of which must be present in useful quantities at the facility. The system extracts the water, natural gas and air and uses a chemical reactor to process all three, forming nitrate ions. Typically, the chemical reactor would require the execution of the Haber chemical process, mentioned above, and the Ostwald processes, also well-known to the field. The nitrate ions thus produced then can be brought into contact with an aqueous system, such as a pipeline or tank, located at the facility.

While this system solves several issues surrounding the transportation and storage of large quantities of nitrate, the exercise of on-site nitrate production presents its own obstacles. First, the above-described system requires that several raw materials to be present and accessible for use. That is, a supply of water and natural gas must be present and a system of extracting the water and natural gas must also exist or be created. Second, reacting the acquired inputs to obtain nitrate is a complex process. The process has several stages, each requiring varying temperatures and pressures.

An alternative, in principle, to the Haber/Ostwald process is a Birkeland-Eyde type process, which can be carried out by an electric plasma arc. In an electric plasma arc, when gas molecules travel across a plasma, it results in a highly ionized gas composed of a stream of different unstable and highly reactive chemical species. According to one embodiment, the electric plasma arc converts air, containing nitrogen and oxygen, into nitric oxide ($N_2+O_2\rightarrow>2NO$), which then is oxidized to produce nitrogen dioxide ($2\ NO+O_2\rightarrow 2\ NO_2$). The nitrogen dioxide can be dissolved in water to give rise to nitric acid ($3\ NO_2+H_2O\rightarrow>2\ HNO_3+NO$). Thus, in contrast to the Haber/Ostwald processes, the only inputs to the electric-arc process are air and electrical energy.

The Haber/Ostwald processes have been used as an alternative to the historic Birkeland-Eyde process, for example, in synthetic fertilizer production, because a conventional electric plasma arc requires a significant amount of energy and has a low nitrate output in comparison to the Haber/Ostwald process. In oil well and water processing applications, daily nitrate requirements at locations where the resultant fertilizer (e.g., nitrate) can find ready application are relatively low and large sources of energy typically are available at oil wells or at water processing sites. This combination of factors greatly favor the on-site production of nitrate with an electric plasma arc process. Further, in hydrogen sulfide prevention and enhanced oil recovery applications, accommodating larger energy consumption is economically preferable to shipping and storage of nitrate or to relying upon a continuous supply of water and natural gas. Pursuant to this invention, providing for the on-site production of nitrate ions by means of an electric plasma arc process obviates the need for such reliance.

As described above, a system with an electric plasma arc reactor will react nitrogen and oxygen present in ambient air to produce nitrogen compounds. When these nitrogen compounds are brought into contact with water present in a water processing system, nitrate ions are produced in the manner discussed previously. The presence of nitrate ions in the water processing system reduces and prevents hydrogen sulfide formation and, in oil specific applications, enhances oil recovery. Further, the system eliminates major costs of conventional techniques including the transportation and storage of nitrate and the need for a continuous supply of natural gas and water.

The apparatus and methodology of the invention are not limited to $H_2S$ reduction or oil field applications. Thus, the invention can be employed to control hydrogen sulfide in landfills, cooling tower water, coal slurry pipelines, and other tanks, pipelines or equipment that contain water or that have a water phase. The apparatus and methodology of the invention can be used in pits, in water-containment ponds, or in water injection systems where water is put underground. Additionally, the inventive approach is suitable for applications in the mining industry, e.g., for metal recovery (bioleaching) and eliminating acid mine drainage, for treating waste water systems such as sewage, for treating $H_2S$-contaminated ballast water in shipping, and various other environmental applications.

Apparatus

A shown in FIG. 1, according to one embodiment of the invention a system produces nitrogen compounds on-site and forms nitrate in a water processing system 20. A water processing system 20 can include above-ground facilities equipped with apparatus or equipment that collects or distributes aqueous solutions, such as oil and gas wells, oil-well separators, water storage tanks, pipelines, and injection wells. According to one embodiment, the source of the water present in the water processing system 20 can be seawater, recycled produced water, or aquifer water. According to one embodiment, the water processing system 20 contains SRB and/or, denitrifying microorganisms, and sulfide oxidizing microorganisms before nitrogen compounds are brought into contact with the water processing system 20. In an additional embodiment, the water processing system 20 indigenously comprises a carbon-source nutrient for the denitrifying microorganisms.

The integrated system 10, shown in FIG. 1, comprises a compression device 30 for taking in ambient air (nitrogen and oxygen). According to one embodiment, the integrated system 10 is relatively small so that it can be easily transported to and from various water processing systems 20, as needed. For example, the integrated system 10 can be the size of a conventional office desk, approximately five (5) feet by two (2) feet by three (3) feet. According to another embodiment, the size of the integrated system 10 can be increased or decreased to accommodate the size and nitrate requirements of the water processing system 20 with which it will operate. Further, the integrated system 10 may have wheels and/or skids that allow the integrated system 10 to be easily transported to various locations.

Figure 2:
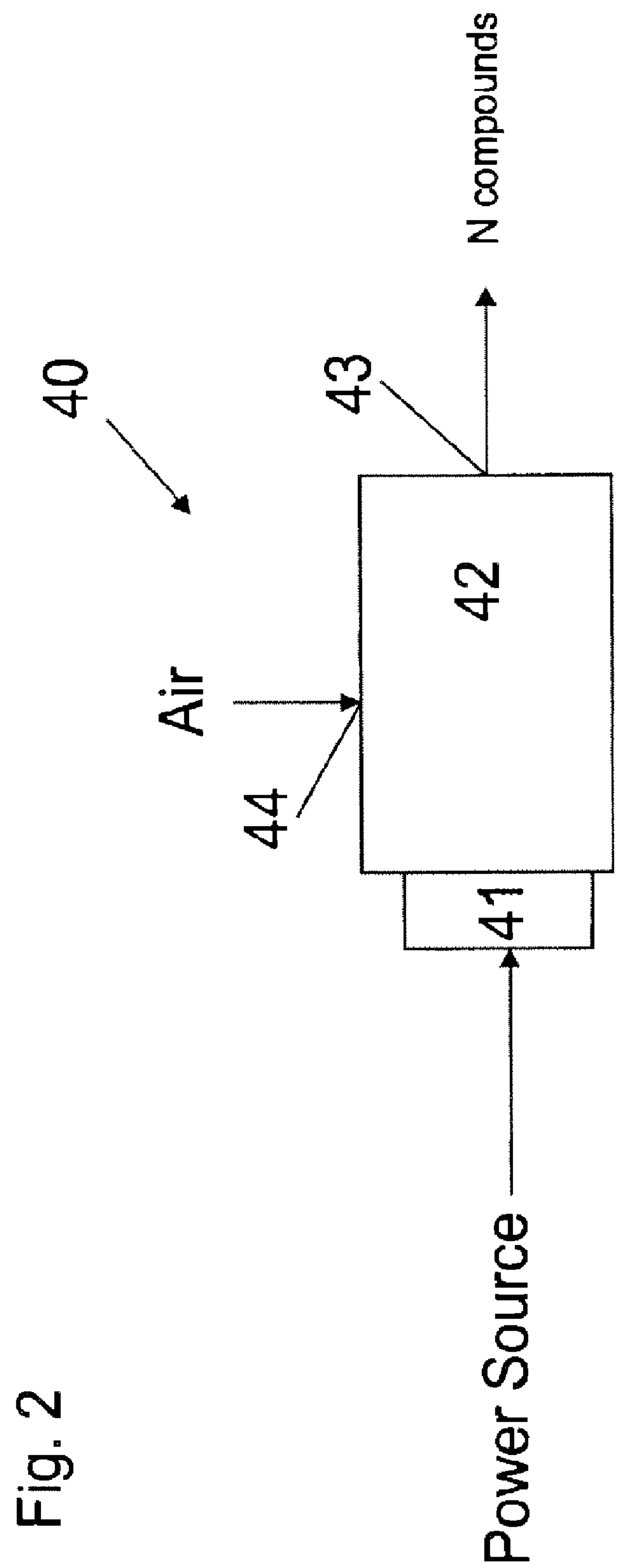
FIG. 2 is a block diagram of an electric plasma arc reactor, according to one embodiment of the present invention.

The integrated system 10 also includes an electric plasma arc reactor 40 for reacting the oxygen and nitrogen from the ambient air to form nitrogen compounds. An electric plasma arc process may be any process that reacts and processes nitrogen and oxygen to obtain nitrogen compounds such as nitric oxide (NO) and nitrogen dioxide ($NO_2$). As shown in FIG. 2, according to one embodiment, the electric plasma arc reactor 40 comprises an electrode 41, a chamber 42 and ports 43, 44. Port 44 supplies air (nitrogen and oxygen) to chamber 42. Preferably, an external power source supplies high-voltage electrical current to the electric plasma arc reactor 40. The electrode 41 discharges the received electrical current in the chamber 42 which causes high voltage arcing. The arcing effectively splits nitrogen and oxygen molecules to form nitrogen oxides (NO, $NO_x$). The electric plasma arc reactor 40 expels the newly formed nitrogen oxides via the port 43.

Figure 3:
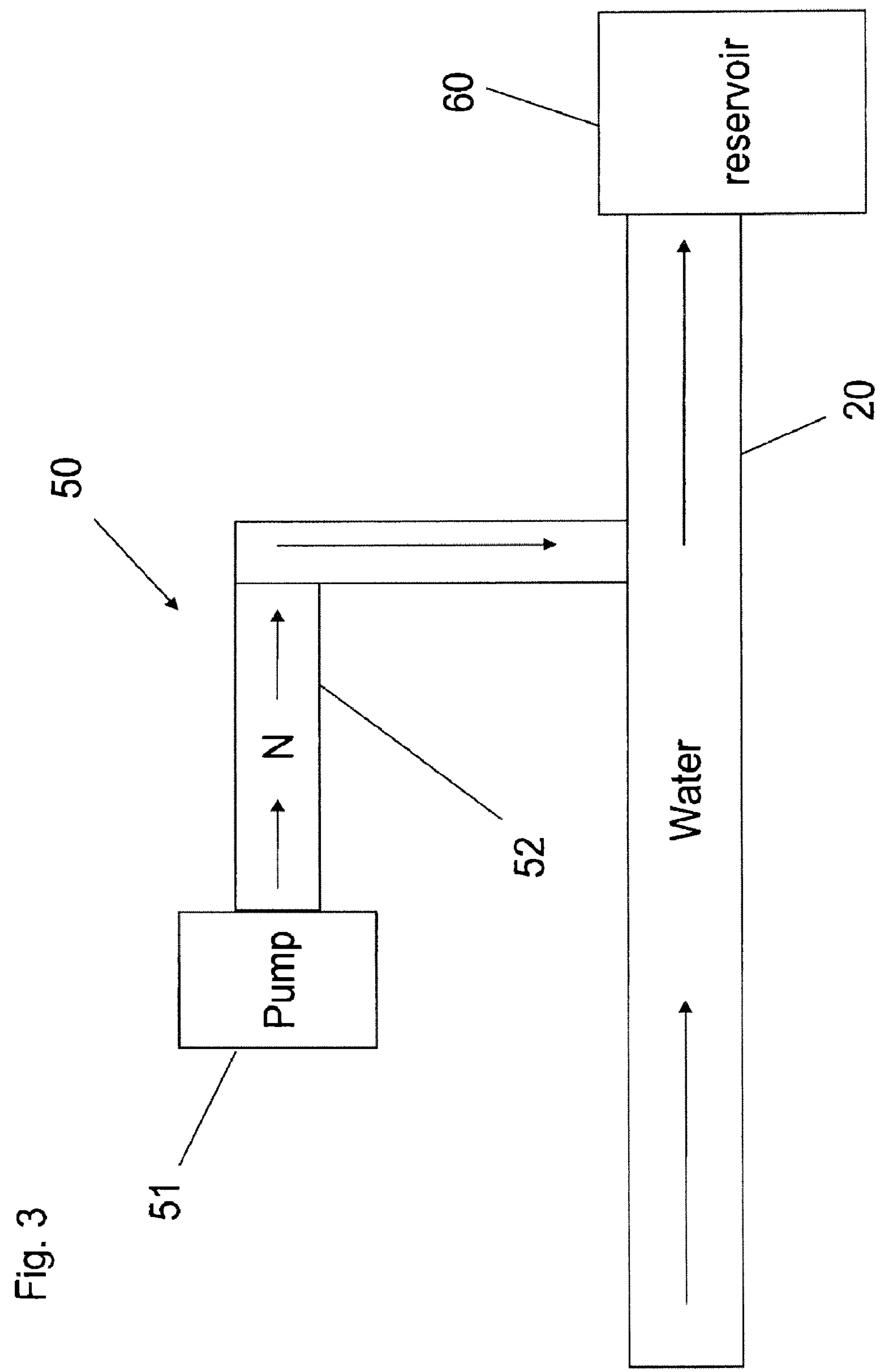
FIG. 3 is a block diagram of a delivery device, according to one embodiment of the present invention.

A delivery device 50, connected to the reactor 40, brings the formed nitrogen compounds into contact with the water processing system 20. According to one embodiment and as illustrated in FIG. 3, the delivery device 50 comprises a pump 51 for pumping the nitrogen compounds formed by the reactor 40 through an aqueduct 52 and into the water processing system 20.

Water processing system 20 supplies a reservoir 60. Reservoir 60 can be any structure or environment where hydrogen sulfide control and/or enhanced oil recovery is needed. Preferably, reservoir 60 is an oil and gas reservoir. According to one embodiment, reservoir 60 can be a landfill, sewage facility or other above or below ground water storage facility.

A controller 70 is operably connected to the compression device 30, the reactor 40 and the delivery device 50. The controller 70 controls the speed and volume of nitrate production. A sensor 80 for monitoring the concentration of nitrate in the water processing system 20 is operably connected to the controller 70.

Operation

A method for the on-site production of nitrate by bringing nitrogen compounds into contact with a water processing system 20 in close proximity to the integrated system 10 will now be explained. Preferably, the portable integrated system 10 is placed in close proximity to a water processing system 20 that requires treatment. According to one embodiment and as shown in FIG. 4, the compression device 30 of the integrated system 10 takes in ambient air and provides oxygen and nitrogen to the electric plasma arc reactor 40.

Figure 4:
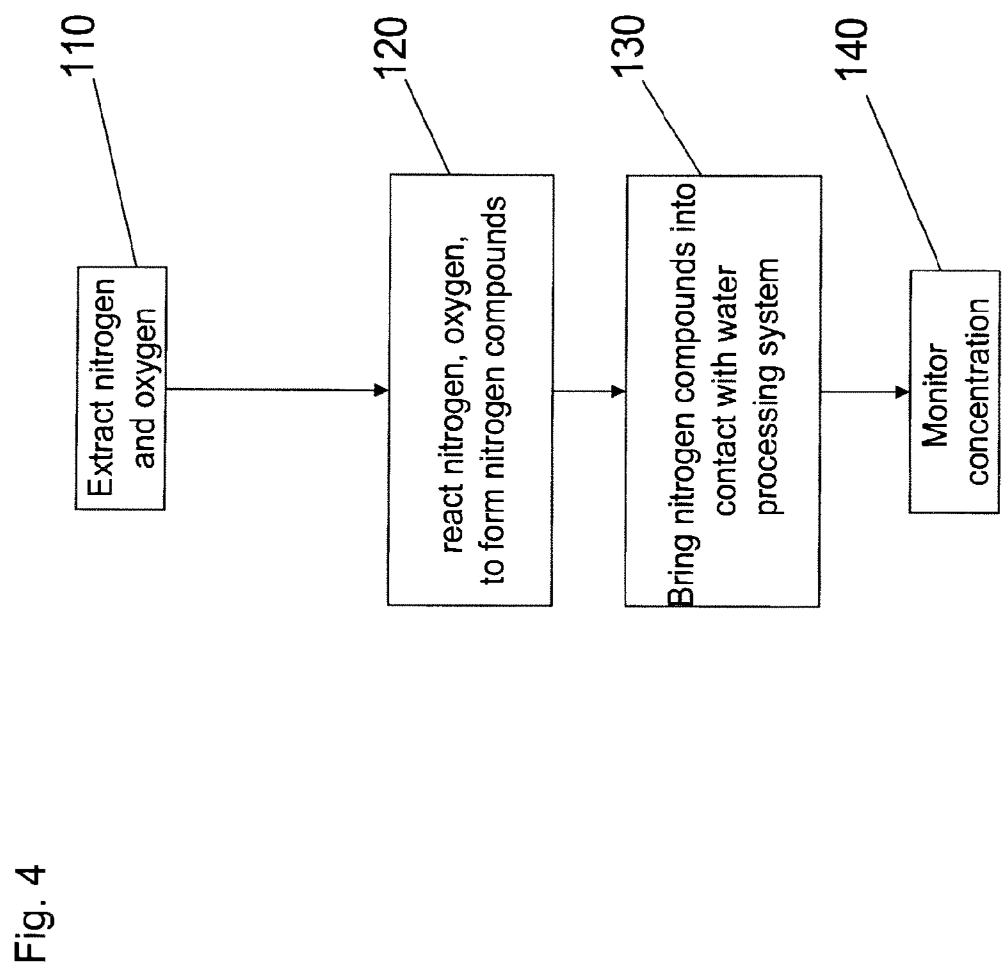
FIG. 4 is a flow chart, illustrating a method for locally producing nitrate, according to one embodiment of the present invention.

As shown in step 120 of FIG. 4, the electric plasma arc reactor 40, processes and reacts the nitrogen and oxygen in the ambient air to produce nitric oxide ions (NO). Ambient air is compressed and injected into one end of the chamber 42 of the electric plasma arc reactor 40 along with electric power to create a swirling vortex of air that forms a high temperature plasma arc in excess of 2,000 degrees C. Any source of electric power can be used to drive the reaction, including coal and gas fired plants, or renewable sources such as wind, solar, or hydro (water). Nitrogen and oxygen in the air react at these temperatures to form nitric oxide ($N_2+O_2+heat\rightarrow+2\ NO$). Cooler air next to the pipe walls contain the arc along the axis of the pipe and facilitates the formation of nitrogen dioxide ($2\ NO+O_2\rightarrow>2\ NO_2$).

As shown in step 130 of FIG. 4, the nitrogen compounds formed by the electric plasma arc reactor 40 are brought into contact with the water processing system 20 via a delivery device 50. When the formed nitric oxide and nitrogen dioxide compounds are introduced into the water processing system 20 the compounds are solubilized and form nitrate ($3\ NO_2+H_2O\rightarrow2\ HNO_3+NO$). The nitrogen compounds may be added to the water processing system 20 in either a batch or a continuous manner. According to one embodiment of the present invention, the water processing system 20 is contacted with nitrogen compounds once. In the alternative, the water processing system 20 is repeatedly treated with nitrogen compounds. The choice of treatment methodology is conditioned by the system to be treated. Thus, if a single oil well is to be treated then a single batch injection of nitrate and nitrite may be most expedient. If an entire water processing system is to be treated, however, a continuous process may be best.

The controller 70 and sensor 80 regulate and monitor the concentration (Step 140) of nitrate in the water. The application for which the integrated system 10 is being used (e.g., $H_2S$ reduction, enhanced oil recovery) will determine how the controller 70 and sensor 80 will operate. The operation of the controller 70 and sensor 80 may be automated. Further, the controller 70 and sensor 80 may be configured to be monitored remotely. Automation and remote monitoring facilitate improved safety measures. Considerations for $H_2S$ reduction and enhanced oil recovery are discussed in turn below.

Hydrogen Sulfide Reduction

For $H_2S$ reduction pursuant to one aspect of the invention, an important consideration is that enough nitrate is formed to promote the growth of denitrifying microorganisms that are normally present in the water processing system 20 along with the SRB. If these denitrifying microorganisms are not present or not present in an adequate amount, however, they may be added with the nitrate to the water processing system 20. Denitrifiers are known to the field and are illustrated in The Prokaryotes: A Handbook on Habitats, Isolation, and Identification of Bacteria, Volumes 1-4 (Springer-Verlag, 1981). These bacteria utilize nitrate or nitrite as a terminal electron acceptor, i.e., they gain energy by respiring it as animals do with oxygen. Some of the bacteria convert the nitrate ($NO_3$) to $NO_2$, $N_2O$, and $N_2$, while others convert it to $NH_3$. Denitrifiers can grow on the same carbon/energy source that the SRB utilize and due to thermodynamic and physiological considerations, the denitrifying bacteria are much better competitors for the carbon/energy sources, thus denying their use for SRB growth and subsequent sulfide formation. Other growth conditions and mechanisms are also established by the denitrifying bacteria that destroy existing hydrogen sulfide and block the sulfide production capabilities of SRB. Those who are knowledgeable in this field, using the principles described above, readily can determine the appropriate amount of nitrate to be formed, thereby removing any preformed hydrogen sulfide and preventing SRB from producing additional hydrogen sulfide.

Enhanced Oil Recovery

According to another embodiment of the invention, the controller 70 determines the concentration of nitrate produced in the water processing system 20 that feeds water solution to oil reservoirs to carry out enhanced oil recovery, also known as oil recovery enhanced by microbial actions. Denitrifying microorganisms stimulated by nitrate will act as agents, producing metabolic products and mechanisms such as water diversion, biopolymers, biosolvents, biosurfactants, biogas and the like during microbial enhanced oil recovery processes. That is, the denitrifying bacteria and products of such bacteria cause the release of oil by the above noted mechanisms including water diversion occurring in the high permeability zones directing the water to be preferentially diverted into lower permeability zones, causing the enhanced displacement of oil.

Accordingly, growing the denitrifiers in a water processing system 20 not only removes existing hydrogen sulfide and prevents the formation of additional hydrogen sulfide, but also results in a water processing system 20 which can be used in oil recovery enhanced by microbial action processes. Nitrate is formed in the water processing system 20 either before or during the oil recovery steps so that hydrogen sulfide does not enter the subterranean formation. The water processing system 20 may then be used in enhanced oil recovery processes, which are known per se. For example, the treated water processing system 20 is used to inject a subterranean oil-bearing formation to displace oil from the formation through microbial action and metabolism that produce conditions, mechanisms, and bio-products which include the aforementioned biosurfactants, biosolvents, biopolymers, and biogases, all of which are known to aid in incremental oil production. The water processing system 20 containing denitrifiers with reduced or no hydrogen sulfide is more effective in recovering oil because the clogging effect of iron sulfide precipitates is removed and there is less production equipment corrosion, destructive conditions that typically increase the expense of oil recovery operations and ultimately lead to the early abandonment of oil fields.

Accordingly, the present invention is suitable for a water processing system 20, for use in enhanced oil recovery. The invention reduces the amount of hydrogen sulfide present in subterranean formations, which prevents oil souring, clogging, and corrosion. Health and safety issues related to production and transportation of dry nitrate are eliminated, since no dry nitrate is manufactured and reactor-produced ions are immediately solubilzed by water into nitrate. On-site nitrate generation will ensure a constant, continuous, and low cost supply of nitrates needed to combat $H_2S$ contamination and enhance oil production.

While the particular application of on-site nitrate production is directed to oil and gas field usage, the same on-site nitrate production can be used in other aqueous situations where sulfide problems have or are occurring and which lead to operational corrosion and health and safety problems resulting from biogenic sulfide production. Examples are sewage plant operations and landfills where the transport and storage of nitrate to these sites are hazardous, costly, environmentally unacceptable; or not practical. The presence of on-site generation of nitrate requiring only air and electrical power which can also be generated on-site by clean, renewable sources such as wind, water, or solar, make such units eminently suitable for isolated or remote locations where the need for nitrate is present but not practical or economical for delivery of nitrates from off-site manufacturing and transportation chains. Such additional usage of on-site nitrate production with an electric plasma are process could involve application in various agricultural sites as an on-site fertilizer source.

What is claimed is:

1. A system by which nitrogen compounds are produced on-site and brought into contact with a water processing system, comprising:

(A) a portable integrated system that is comprised of (i) a compression device that takes in ambient air and (ii) an electric plasma arc reactor, connected to said compression device, that processes and reacts oxygen and nitrogen present in said ambient air to form said nitrogen compounds;

(B) a delivery device, interconnecting said portable integrated system to said water processing system, for bringing said nitrogen compounds into contact with said water processing system to form nitrate; and (C) an underground water reservoir that receives water from said water processing system in combination with said nitrogen compounds.

2. The system of claim 1, further comprising a controller that is operably connected to each of said compression device, said electric plasma arc reactor and said delivery device, and that is configured to control speed and volume of producing said nitrogen compounds.

3. The system of claim 1, wherein said nitrogen compounds are at least one of nitric oxide NO or nitrogen dioxide $NO_2$.

4. The system of claim 1, wherein said water processing system comprises one or more of a pipeline, a tank, a well, a water treatment facility, or water transportation equipment.

5. The system of claim 1, wherein said delivery device further comprises (i) an aqueduct, extending from said portable integrated system to said water processing system, and (ii) a pump for moving said nitrogen compounds through said aqueduct to said water processing system.

6. The system of claim 1, further comprising a sensor for monitoring a concentration of nitrate in said water processing system.

7. The system of claim 1, further comprising skids or wheels for transporting said portable integrated system.

8. The system of claim 1, wherein a size of said portable integrated system is modified to correspond to nitrate requirements of said water processing system.

9. The system of claim 1, wherein said compression device, said electric plasma arc reactor and said delivery device are automated.

10. A method of producing nitrogen compounds at a facility and bringing said nitrogen compounds into contact with a water processing system in proximity to said facility, comprising:

(A) providing a portable integrated system for:

(i) taking in oxygen and nitrogen from ambient air;

(ii) processing and reacting oxygen and nitrogen present in said ambient air with an electric plasma arc reactor to form said nitrogen compounds;

(B) bringing said nitrogen compounds into contact with said water processing system to form nitrate and cause the formation of nitrate ions in said water processing system in a concentration sufficient to control hydrogen sulfide; and (C) sending water in combination with said nitrogen compounds to an underground water reservoir.

11. The method of claim 10, wherein said nitrogen compounds are at least one of nitric oxide NO or nitrogen dioxide $NO_2$.

12. The method of claim 10, further comprising the step of monitoring a concentration of nitrate ions ($NO_3$) in said water processing system.

13. The method of claim 10, wherein said water processing system contains sulfate-reducing bacteria.

14. The method of claim 10, wherein said water processing system contains denitrifying microorganisms and sulfide oxidizing microorganisms.

15. The method of claim 14, wherein said water processing system indigenously comprises a carbon-source nutrient for said denitrifying microorganisms.

16. The method of claim 14, wherein a carbon-source nutrient for said denitrifying microorganisms is added to said water processing system before, concomitant with, or after said nitrogen compounds are added to said water processing system.

17. The method of claim 10, further comprising adding denitrifying microorganisms to said water processing system before, concomitant with, or after said nitrogen compounds are added to said water processing system.

18. The method of claim 10 which is a batch method, whereby said water processing system is contacted once with said nitrogen compounds.

19. The method of claim 10 which is a continuous method, whereby said water processing system is repeatedly treated with said nitrogen compounds.

* * * * *